United States Patent
Gremaud et al.

(10) Patent No.: US 8,954,696 B2
(45) Date of Patent: *Feb. 10, 2015

(54) SECURE MEMORY MANAGEMENT SYSTEM AND METHOD

(71) Applicant: Nagravision S.A., Cheseaux-sur-Lausanne (CH)

(72) Inventors: Fabien Gremaud, Chatel-St-Denis (CH); Christophe Gogniat, Romanel-sur-Lausanne (CH); Marc Bellocchio, Aubagne (FR); Pascal Fuchs, Lausanne (CH)

(73) Assignee: Nagravision S.A., Cheseaux-sur-Lausanne (CH)

( * ) Notice: Subject to any disclaimer, the term of this patent is extended or adjusted under 35 U.S.C. 154(b) by 0 days.
This patent is subject to a terminal disclaimer.

(21) Appl. No.: 13/917,060

(22) Filed: Jun. 13, 2013

(65) Prior Publication Data
US 2013/0276149 A1 Oct. 17, 2013

Related U.S. Application Data

(63) Continuation-in-part of application No. 12/489,712, filed on Jun. 23, 2009, now Pat. No. 8,489,836.

(30) Foreign Application Priority Data

Jun. 24, 2008 (EP) .................................. 08158870
Jul. 30, 2008 (EP) .................................. 08161479

(51) Int. Cl.
*G06F 21/10* (2013.01)
*G06F 21/64* (2013.01)
(Continued)

(52) U.S. Cl.
CPC .............. *G06F 21/64* (2013.01); *G06F 21/57* (2013.01); *G06F 21/79* (2013.01)
USPC ........................................................ 711/163

(58) Field of Classification Search
None
See application file for complete search history.

(56) References Cited

U.S. PATENT DOCUMENTS

| 4,680,700 A | 7/1987 | Hester et al. |
| 5,237,616 A | 8/1993 | Abraham et al. |

(Continued)

FOREIGN PATENT DOCUMENTS

| CN | 101034378 | 9/2007 |
| WO | WO 2006/093618 | 9/2006 |

OTHER PUBLICATIONS

Notice of Opposition filed in EP 2310976, dated Aug. 9, 2012.
International Search Report issued in PCT/EP2009/057830, mailed Oct. 20, 2009.

(Continued)

*Primary Examiner* — Duc Doan
(74) *Attorney, Agent, or Firm* — DLA Piper LLP US (57) ABSTRACT

The present invention describes a system and a method for securely loading digital information from an external storage device in a non-trusted environment into a memory module in a trusted environment within a data processing system. A master mode and a service mode are described, the master mode being when the secure loading is requested by a secure processor residing within the trusted environment and the service mode being when the loading is requested by an element which is external to the trusted environment i.e. in the non-trusted environment. The system comprises at least one storage device, one memory module and at least one first processor, and further comprises a memory access controller module connected between the processor and the memory module, and a secure memory management module connected to the processor, the memory module, the storage device and the memory access controller. Requests for data made by either the first processor or the external element are passed to the secure memory management module, which loads the data from the storage device to the memory module and configures the memory access controller such that the processor will have access to the data.

17 Claims, 1 Drawing Sheet

(51) Int. Cl.
  *G06F 21/57* (2013.01)
  *G06F 21/79* (2013.01)

(56) References Cited

U.S. PATENT DOCUMENTS

| | | |
|---|---|---|
| 5,757,919 A | 5/1998 | Herbert et al. |
| 5,825,878 A | 10/1998 | Takahashi et al. |
| 6,336,187 B1 | 1/2002 | Kern et al. |
| 6,339,815 B1 | 1/2002 | Feng et al. |
| 7,043,616 B1 | 5/2006 | McGrath |
| 7,133,990 B2 | 11/2006 | Link et al. |
| 7,373,506 B2 | 5/2008 | Asano et al. |
| 7,401,358 B1 | 7/2008 | Christie et al. |
| 2002/0073326 A1 | 6/2002 | Fontijn |
| 2003/0037220 A1 | 2/2003 | Anvin et al. |
| 2003/0196096 A1 | 10/2003 | Sutton |
| 2003/0200451 A1 | 10/2003 | Evans et al. |
| 2004/0234074 A1 | 11/2004 | Sprunk |
| 2006/0036830 A1 | 2/2006 | Dinechin et al. |
| 2006/0090084 A1 | 4/2006 | Buer |
| 2006/0218425 A1 | 9/2006 | Ding et al. |
| 2008/0028128 A1 | 1/2008 | Rueping |
| 2008/0072070 A1 | 3/2008 | LaMacchia et al. |
| 2010/0023747 A1 | 1/2010 | Asnaashari et al. |
| 2010/0251357 A1 | 9/2010 | Asano et al. |
| 2011/0173409 A1 | 7/2011 | Sibert |

OTHER PUBLICATIONS

Written Opinion issued in PCT/EP2009/057830, mailed Oct. 20, 2009.
European Search Report issued in EP 08 15 8870, dated Sep. 11, 2008.
Office Action issued in CN 200980123826.4 dated Oct. 29, 2012.
English language translation of Office Action issued in CN 200980123826.4 dated Oct. 29, 2012.
English ianguageabstrac of CN 101034378, published Sep. 12, 2007.

FIG. 1

FIG. 2

SECURE MEMORY MANAGEMENT SYSTEM AND METHOD

This is a continuation-in-part application of application Ser. No. 12/489,712, filed on Jun. 23, 2009, which claims priority under 35 U.S.C. §119 from European Patent Applications number 08158870.9 and number 08161479.4, flied on Jun. 24, 2008 and Jul. 30, 2008, respectively, at the European Patent Office, the entire contents of which are herein incorporated by reference.

INTRODUCTION

The present invention relates to the domain of computer security, particularly in guaranteeing the secure loading of data or applications into volatile, working memory or in isolating concurrent applications from each other such that one application may not modify data or code intended for another application.

BACKGROUND OF THE INVENTION

A data processing system may include hardware resources such as a processing unit (CPU), volatile memory (RAM) and non-volatile memory (ROM). The data processing system may operate under the control of at least one operating system and may perform routines according to one or several software resources or applications. The applications may be stored in non-volatile memory and loaded into volatile memory when required to be executed. During the execution of an application, the data required by said application or the data which is produced by the application may be stored in the non-volatile or volatile memory or transferred from one memory to another.

With the advent of multiple connectivity options for data processing systems, including wireless connectivity, and with the huge growth in the use of mobile data processing systems, the need to protect these systems from malicious attacks has become increasingly important. Malicious attacks can be aimed at interfering with system booting, modifying the operating system, intercepting and/or modifying data produced by or utilized by some application.

Indeed, it has now become a necessary requirement to protect data processing systems against fraudulent manipulations and attacks on their integrity. Such malicious attacks may come in the form of software designed to take over a data processing system's operating system or otherwise interfere with the normal processing sequence of the data processing system without the user's knowledge or approval. Such software is generally known as malware. The presence of malware in a data processing system is generally difficult to remedy and can lead to complete system failure or even to irreparable damage to the system.

Computer viruses, worms, Trojan horses, spyware etc. are all different types of malware. The different types of malware can attack the processing system in various ways such as by intercepting data which was meant for another application or by monitoring key strokes in order to steal passwords or other information which is meant to be kept secret, modifying or otherwise altering data or corrupting files, modifying a program in order to cause it to crash or to execute some function which was not originally intended by the user.

Systems to combat against malware attacks exist and usually feature a memory management unit, which is configurable by the system's CPU. Security is thus compromised if the CPU suffers an attack from an ill-intentioned user. Because of the complexity exhibited by a modern CPU, the additional security functions which would be required in order to minimize the possibility of such an attack would lead to a significant cost increase in terms of the extra on-chip real estate necessary to implement such functions and would lead to computing overhead and therefore compromise the speed of operation. Again, due to the complexity of a typical CPU, such modifications could not offer a high level of security with an acceptable level of confidence. Accordingly, it would be desirable to have a cost-efficient and size-efficient solution providing secure management of the loading or unloading of data or applications into or out of memories in a data processing system.

A secure memory management unit for a microprocessor is described in U.S. Pat. No. 5,825,878. This document discloses the use of a secure embedded memory management unit for a microprocessor for transferring encrypted data and encrypted instructions from an external memory. Security is afforded by the fact that the direct memory access controller is embedded on the same chip as the microprocessor, making it difficult for a malicious third party to gain access to instructions and commands from within the microprocessor chip itself, where the signals are in clear. No means for ensuring that the data in the embedded memory is only accessed by an authorised processor operating in a particular mode. As such, there is still a possibility for an unscrupulous party to replace memory content by malicious content.

U.S. Patent Application Publication No. 2003/0,037,220 A1 discloses an MMU (memory management unit) which uses segmentation addressing, whereby stored data comprises a segment descriptor. The segment descriptor is used to allow ease of address mapping. The presence of the segment descriptor simplifies the address mapping thereby eliminating the need for a separate loader. This does not therefore address any particular security-related problem.

SUMMARY OF THE INVENTION

The present invention describes a system and a method for securely loading digital information from a storage device into a memory module. The system is a data processing system comprising at least one storage device (SD), at least one memory module (MM) and at least one processor (CP), said storage device (SD) having at least one segment of data as well as access and authentication data related to the segment, characterized in that it comprises a memory access controller (RA) connected between the processor (CP) and the memory module (MM), and a secure memory management module (SMM) connected to the processor (CP), the memory module (MM), the storage device (SD) and the memory access controller (RA), said secure memory management module (SMM) comprising means to receive a request from the processor (CP) for a segment stored in the storage device (SD), said segment having at least one access condition and at least one piece of authentication data pertaining to it, said secure memory management module (SMM) further comprising means to load the requested segment from the storage device (SD) to the memory module (MM), means to authenticate the access condition using the authentication data, means to configure the memory access controller (RA) using the access condition, said memory access controller (RA) having means to detect a processor status from the processor (CP) and means to compare the access condition with the processor status, the memory access controller (RA) having means to allow or to block the access to the memory module (MM) according to the result of the comparison.

More precisely, according to a first aspect of the present invention, there is provided a data processing system comprising:
- at least one processor configured to request at least one selected from the group consisting of at least one first digital information and at least one second digital information;
- at least one memory module configured for storing the at least one first digital information;
- at least one memory access controller connected between the at least one processor and the at least one memory module;
- at least one storage device comprising:
  - at least one segment comprising the at least one second digital information;
  - at least one access condition associated with the at least one segment;
  - at least one first authentication data associated with the at least one segment, the at least one first authentication data allowing for the at least one segment to be authenticated; and
  - at least one second authentication data associated with the at least one access condition, the at least one second authentication data allowing for the at least one access condition to be authenticated; and
- at least one secure memory management module connected to the at least one processor, the at least one memory module, the at least one storage device and the at least one memory access controller;
- wherein the at least one secure memory management module is configured to monitor the request, and when the request corresponds to the second digital information, to:
  - authenticate the at least one segment using the first authentication data;
  - authenticate the at least one access condition using the second authentication data;
  - send the at least one access condition to the memory access controller; and
  - load the at least one segment from the at least one storage device to the at least one memory module; and
- wherein the memory access controller is configured to:
  - detect a processor status of the at least one processor;
  - compare the at least one access condition with the processor status; and
  - provide access to the at least one memory module by the at least one processor when the processor status satisfies the at least one access condition. The method used in the present invention to securely load data from the storage device to the memory module comprises the following steps:
- receiving, by the secure memory management module (SMM), a request from the processor (CP) for digital information,
- locating a segment in the storage device (SD) containing the requested digital information,
- extracting a set of access conditions and authentication data pertaining to said segment,
- authenticating the access conditions with the authentication data,
- determining an appropriate region in the memory module (MM) to accommodate the located segment,
- loading said located segment into the determined region in the memory module (MM),
- configuring the memory access controller module (RA) using the extracted access conditions.

In more precise terms, the method according to another aspect of the present invention may be expressed as a method for securely loading digital information from at least one storage device into at least one memory module in a data processing system, said data processing system comprising the at least one storage device, the at least one memory module, at least one processor, a memory access controller module connected between the at least one processor and the at least one memory module, and a secure memory management module connected to the at least one processor, the at least one memory module, the at least one storage device and the memory access controller, said method comprising:
- requesting, with the at least one processor, at least one selected from the group consisting of at least one first digital information and at least one second digital information;
- receiving, with the secure memory management module, a request from the at least one processor for digital information;
- locating, in at least one memory module, the at least one first digital Information;
- locating at least one segment in the at least one storage device containing the at least one second digital information;
- extracting, from the at least one storage device:
  - at least one access condition associated with the at least one segment;
  - at least one first authentication data associated with the at least one segment, the at least one first authentication data allowing for the at least one segment to be authenticated; and
  - at least one second authentication data associated with the at least one access condition, the at least one second authentication data allowing for the at least one access condition to be authenticated;
- monitoring, with the secure memory management module, the request, and when the request corresponds to the second digital information:
  - authenticating, with the secure memory management module, the at least one segment with the first authentication data and the at least one access condition with the second authentication data;
  - determining, with the secure memory management module, an appropriate region in the at least one memory module to accommodate the located at least one segment;
  - loading said located at least one segment into the appropriate region in the at least one memory module when the at least one segment has been authenticated by the secure memory management module;
  - sending, with the secure memory management module, the at least one access condition to the memory access controller;
- detecting, with the memory access controller, a processor status of the at least one processor;
- comparing, with the memory access controller, the at least one access condition with the processor status, and
- providing access, with the memory access controller, to the at least one memory module by the at least one processor when the processor status satisfies the at least one access condition.

The above described aspects of the present invention therefore use a memory access controller (RA) to serve as a firewall between the processor (CP) and the memory module (MM) coupled with a secure memory management module (SMM) to load the memory module (MM) and configure the memory access controller (RA). This leads to a high level of security in the system since the secure memory management module (SMM) is of simple architecture with a reduced set of commands such as load and store, and therefore less prone to attack than would be a CPU in the case that said CPU were responsible for configuring the memory access controller module.

According to yet a further aspect of the present invention, provision is made for a system similar to the one described above but further comprising one or more external entities in the sense that the entity or entities are outside the secure zone comprising the secure processor, the internal memory, the memory access controller and the secure memory management module, therefore in the same zone as the storage device described above. By external entity it is meant any entity in the external zone thus described, capable of requesting a service from the secure processor. For example, the external entity could be a microcontroller comprising a second processor connected to a storage device, both being in the external zone. An external entity may otherwise be a hardware processor or a software process or even a module comprising a mix of hardware and software processing. In general terms then an external entity can be anything in the external zone which can be configured to make a request to the internal processor, the request being to execute a service.

According to this aspect of the present invention, provision is made for a data processing system comprising:
at least one first processor;
at least one memory module configured for storing at least one first digital information;
at least one memory access controller connected between the at least one first processor and the at least one memory module;
at least one external element having access to a storage device, the storage device comprising:
  at least one segment comprising at least one second digital information;
  at least one access condition associated with the at least one segment;
  at least one first authentication data associated with the at least one segment, the at least one first authentication data allowing for the at least one segment to be authenticated; and
  at least one second authentication data associated with the at least one access condition, the at least one second authentication data allowing for the at least one access condition to be authenticated; and
at least one secure memory management module connected to the at least one first processor, the at least one memory module, the at least one external element and the at least one memory access controller;
wherein the external element is configured to request at least one selected from the group consisting of the at least one first digital information and the at least one second digital information, the at least one secure memory management module being configured to monitor the request, and when the request corresponds to the second digital information, to:
  authenticate the at least one segment using the first authentication data;
  authenticate the at least one access condition using the second authentication data;
  send the at least one access condition to the memory access controller; and
  load the at least one segment from the at least one storage device to the at least one memory module; and
wherein the memory access controller is configured to:
  detect a processor status of the at least one first processor;
  compare the at least one access condition with the processor status; and
  provide access to the at least one memory module by the at least one first processor when the processor status satisfies the at least one access condition.

According to another aspect of the present invention, provision is made for a method for securely loading digital information from at least one storage device into at least one memory module in a data processing system, said data processing system comprising at least one external element having access to the at least one storage device, said data processing system further comprising the at least one memory module, at least one first processor, a memory access controller module connected between the at least one processor and the at least one memory module, and a secure memory management module connected to the at least one first processor, the at least one memory module, the at least one external element and the memory access controller, said method comprising:
requesting, with the at least one external element, at least one selected from the group consisting of at least one first digital information and at least one second digital information;
monitoring, with the secure memory management module, the request, and when the request corresponds to the second digital information:
  locating at least one segment in the at least one storage device containing the at least one second digital information;
  extracting, from the at least one storage device:
    at least one access condition associated with the at least one segment;
    at least one first authentication data associated with the at least one segment, the at least one first authentication data allowing for the at least one segment to be authenticated; and
    at least one second authentication data associated with the at least one access condition, the at least one second authentication data allowing for the at least one access condition to be authenticated;
  authenticating, with the secure memory management module, the at least one segment with the first authentication data and the at least one access condition with the second authentication data;
  determining, with the secure memory management module, an appropriate region in the at least one memory module to accommodate the located at least one segment;
  loading said located at least one segment into the appropriate region in the at least one memory module when the at least one segment has been authenticated by the secure memory management module;
  sending, with the secure memory management module, the at least one access condition to the memory access controller;
detecting, with the memory access controller, a processor status of the at least one first processor;
comparing, with the memory access controller, the at least one access condition with the processor status, and
providing access, with the memory access controller, to the at least one memory module by the at least one first processor when the processor status satisfies the at least one access condition.

According to a still further aspect of the present invention, without compromising the gains achieved by having the secure memory management module as a separate module from the secure processor where each of the secure processor and the secure management module were physically separate, it is possible to include the secure memory management module's functionality within the same physical (or software) function of the processor. According to one embodiment for example the secure processor is a hardware module and the security management module is realised as a software function running within the secure processor block. According to another embodiment the security management module may be realised as a mix of both hardware and software. These embodiments are combinable with any of the other embodiments and aspects of the invention described herein.

BRIEF DESCRIPTION OF THE DRAWINGS

The invention will best be understood by reference to the following detailed description of a preferred embodiment when read in conjunction with the accompanying drawing, wherein.

DETAILED DESCRIPTION OF A PREFERRED EMBODIMENT

Modern data processing systems are generally memory intensive. This fact, coupled with the fact that on-chip memory can be expensive, leads to the necessity of relying on significant amounts of off-chip storage in many data processing systems. In the case where security is important, there is a need therefore to be able to secure transfers of data between the off-chip or non-trusted environment and the on-chip or trusted environment. Additionally, with the significant complexity of modern CPUs (processors), it is not easy to modify the processor to be able to achieve the required goal while maintaining the required high level of security, nor is it cheap in terms of on-chip real-estate. Therefore it would be better to have a dedicated piece of hardware, using a limited number of commands such as load and store, to take care of tasks related to memory access.

The present invention describes a hardware solution and a method for providing, within a data processing system, a means for secure loading of digital information from a storage device into a memory module. In general the storage device is in a non-trusted environment and the memory module is in a trusted environment. The invention provides an interface between the trusted environment and the non-trusted environment, through which requests for access to the digital information must pass. The invention includes means for configuring the interface such that a processor having the necessary access rights to the data stored in the memory module will indeed have access to the required part of the memory once it has been loaded. The storage device can take the form of a flash memory, an EPROM, an EEPROM, a ROM, a hard disk, an external server or other such storage means. The memory module will usually take the form of a random access memory (RAM) i.e. a volatile memory. In the context of this document, the term digital information is used to describe data liable to be loaded into the memory module, such as executable code or information generated by executable code or used by executable code.

The secure memory management system of the current invention is integrated into a data processing system (FIG. 1) comprising at least a processor (CP), a memory module (MM) and a storage device (SD) and includes dedicated hardware known as a secure memory management module (SMM) connected between the processor (CP) and memory module (MM) on one side, and the storage device (SD) on the other side, the purpose of the secure memory management module (SMM) being to manage the communication between the processor (CP) and the memory module (MM) as well as to transfer digital information between the storage device (SD) and the memory module (MM), i.e. to load and unload the memory module (MM). The secure memory management system further includes dedicated hardware known as a memory access controller module (RA) placed between the processor (CP) and the memory module (MM). The memory access controller module (RA) acts as a firewall between the processor (CP) and the memory module (MM). The digital information stored in the storage device (SD) has a set of access conditions associated with it, which are stored along with the digital information. The secure memory management module (SMM) configures the memory access controller (RA) to allow the processor (CP), given that said processor (CP) has the appropriate access rights, the correct access to the parts of the memory module (MM) which have been loaded. The secure memory management module (SMM) thus functions together with the memory access controller module (RA) to ensure that the memory module (MM) remains secure.

Figure 1:
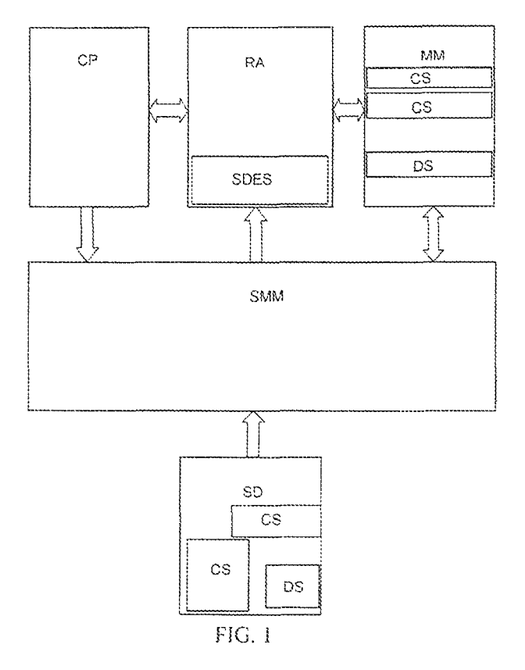
FIG. 1 shows a data processing system comprising a processor (CP), a memory module (MM), a storage device (SD), a memory access controller module (RA) and a secure memory management module (SMM)

In the present invention, a convention known as segmentation is used i.e. the digital information is stored in segments. The segmentation convention is used for the digital information stored in the storage device as well as for the digital information stored in the memory module. A segment is made up of several blocks of digital information comprising a predetermined number of bytes. For example a block of digital information could be 32 bytes long. Each segment has a set of attributes associated with it, such as a segment identification number, the type of data contained in the segment, the length of the segment, the address of the segment, a digital signature, an integrity figure such as a one-way function of the contents of the segment for example, the set of conditions rights describing which processes can have read access or write access or execute access to the segment. These attributes are recorded in a segment header attached to and stored with the segment. FIG. 1 shows two different types of segments, namely code segments (CS) comprising executable code and data segments (DS) comprising digital information which can be used by an application or generated by an application.

Digital information which is currently being used by the processor (CP) is held in the memory module (MM) When the processor (CP) requires access to digital information which does not currently reside in the memory module (MM), the processor (CP) sends a request to the secure memory management module (SMM) for the required digital information. Upon receiving the request from the processor (CP), the secure memory management module (SMM) locates the segment, or the plurality of segments containing the requested digital information, and extracts several pieces of information from the segment header, including access conditions, a digital signature and a segment integrity figure. The secure memory management module (SMM) performs an authentication on the segment by verifying the digital signature according to a predetermined cryptographic technique. The secure memory management module (SMM) performs an integrity check on the segment by calculating an integrity figure, such as a one-way function of the contents of the segment, and comparing the calculated integrity figure with the integrity figure extracted from the segment header. The secure memory management module (SMM) determines an appropriate region in the memory module (MM) capable of accommodating the located segment and loads said segment into the memory module (MM) at the determined region, said region comprising a plurality of addressable memory module locations. In one embodiment of the current invention the integrity check could be done on-the-fly, block by block or segment by segment while loading the memory module (MM). In another embodiment of the current invention, the integrity check could be done in the memory module (MM) after having been loaded. The secure memory management module (SMM) will also configure the memory access controller (RA) so that a processor with the necessary access rights will have the required access to the loaded data.

In general, a data processing system will also comprise some means to do memory mapping, whereby a block or a segment of digital information is accessed by the processor using a virtual address while said block or segment is stored at some physical address in the memory module (MM) which is different from the virtual address. The segment header may further comprise the virtual address of the segment. When the digital information is loaded into an available space in the memory module, the mapping is updated to reflect a link between the virtual address and the physical address where the information was loaded. In one embodiment of the current invention this memory mapping could vary between successive loads of the memory module (MM).

In another embodiment of the present invention the digital information in the storage device is preferably in encrypted format. In this case the segment headers further comprises segment keys with which to decrypt the segments. The segment keys are preferably extracted from the segment headers by the secure memory management module (SMM) and the keys used to decrypt the digital information before loading into the memory module (MM).

The memory access controller (RA) contains a segment descriptor (SDES). The segment descriptor holds part of the segment header corresponding to each segment of digital information that has been loaded into the memory module. As each segment is loaded, the secure memory management module, having extracted and authenticated the access conditions to that segment from the segment header, updates the access conditions in the segment descriptor in such a way as to allow the processor, given that said processor has the appropriate access rights, to have access to the corresponding segment in the memory module. Until the segment descriptor is updated, the processor has no access to the part of the memory module where the digital information is being loaded. In order to allow for compatibility over several different operating systems, the segment descriptors could be of an "ELF" format (Executable and Linking Format), which is a standard file format for executables, object code, libraries etc.

The segment descriptor specifies which types of access are allowed by the processor. For example, a certain range of addresses may only be accessible in read mode whereas any attempt to write to that region would be disallowed. This type of information is indicated in the segment descriptor. Similarly, regions where a processor is allowed to write or to erase are indicated in the segment descriptor. The segment descriptor may also indicate regions which hold executable routines or functions so that a processor would need to have the right to execute in order to be able to fetch an instruction from a region indicated as holding executables (or certain process ids would have the right to execute certain functions).

Beside the data and the address buses, the transfer from or to peripherals is controlled by control lines (read/write) defining the access type. Other lines can be used to determine if executable code is fetched (execute mode) or if the processor is reading/writing data in a memory.

One example of the access conditions attached to a segment define the condition in read, write or execute mode.

According to another embodiment, the access conditions are defined in relation with the mode of the processor.

Whether or not a processor will have the right to access a certain piece of data depends then on the access conditions associated attached to the segment in which that piece of data is located, and on the mode in which the processor is running at the time that it requests that data—for example the processor can be in user mode or super-user mode. The mode of operation is usually indicated by a bit in a status or mode register associated with the processor. The mode in which the processor runs at any particular time can be verified by checking the state of the relevant register. This register can be connected to communication lines with the memory access controller allowing the latter to determine in which mode is the processor. This mode can be also communicated to the memory access controller by transferring the register value via the main bus. Depending on the mode of operation of the processor at the time it makes a request for a piece of data, access can either be granted or denied according to the result of a comparison between the mode of operation of the processor and the mode required by that piece of data according to associated access conditions held in the segment descriptor. Similarly, it is easy to imagine how a process identifier (process id) could be used, in a similar way to processor mode, to indicate which processes have a right to access particular segments of data.

The role of the memory access controller is then to receive the value of the processor mode and compare this mode with the content of the access conditions attached to the segment.

In a further embodiment of the present invention, a segment of data may have a plurality of sets of access conditions associated with it, each of the sets pertaining to a particular mode of processor operation. When the processor requests access to a piece of data in a segment for which there is a plurality of access conditions, then the memory access controller (RA) will apply the set of access conditions which are relevant to the mode in which the processor is running. The processor mode and the type of the processor access (read/write/execute) is compared with the set of access conditions in order to decide whether or not the particular access to the piece of data should be given.

The access conditions attached to a segment therefore define the mode that the processor needs to have in order to access the segment, the status including the type of access requested and the mode of operation of the processor.

In a further embodiment of the present invention, a light encryption could be used on the digital information before storing it in the memory module. According to a first embodiment, the encryption key would be based on a random number generated by the secure memory management module. This number can be generated while initializing the system so that each time the system is powered on, a new key will be generated. The digital information in a segment would be encrypted under this key and the key would be placed in the segment descriptor corresponding to that segment. The random key could alternatively be generated each time a segment is uploaded. The digital information would then be decrypted by the memory access controller at the time that the processor requests that information. In yet another embodiment of the current invention, the encryption key could be a function of the physical address (the actual address in the memory module) in which the digital information is loaded (i.e. calculating a one-way function of the physical address).

As well as ensuring the security of digital information loaded into the memory module, the current invention also allows for the processor to complete other tasks while the memory module is being loaded, since all functions related to the loading of the memory module are delegated to the secure memory management module. With the high level of complexity built into modern processors, the present invention provides for the advantage of guaranteeing a high level of security by having the described memory management functions handled by a dedicated hardware system represented by the combination of the memory access controller (RA) and the secure memory management module (SMM) rather than by trying to include these functions in the already complex processor.

The skilled person will of course realise from the above description that where it is described that secure memory management module is connected to the first processor, the memory module and the memory access controller, while implying that the secure memory management module is a separate module from the processor, this does not exclude the possibility of either or both of these modules being realised in software or hardware. For example, the processor could be realised as a hardware module while the secure memory management module could be realised as a software module. The secure memory management module could also be realised as a mixed-mode hardware/software module.

The aspects of the present invention thus described above may be described as allowing for a "master mode" version of the function realised by the invention to be performed. According to yet a further aspect of the present invention, it is possible to realise a similar functionality but in a so-called "service mode".

To re-cap the so-called master mode, as mentioned above, the memory access controller acts as a firewall between the processor and the memory module in the sense that it only allows the processor to access the memory module directly if the memory access requested by the processor relates to data which is already loaded in the memory module. The secure memory management module monitors the processor to see what memory accesses it is trying to do. If the processor appears to be requesting data which is not already in the memory module, then the secure memory management module will fetch a segment in which the requested data lies, from a(n external) storage device. The segment has access control data associated with it. The secure memory management module loads the segment from the storage device into the memory module and programs or instructs the memory access controller to give the processor access to the segment in the memory module if the processor satisfies the access conditions at that particular time. This is done by the secure memory management module updating a segment descriptor in the memory access controller using the access conditions found in the segment (header). The secure memory management module also checks the authenticity of the data (segment) and the authenticity of the access conditions using at least part of the segment header.

The skilled person will recognise that the processor (CP) comprised within the thus-described system, referring to FIG. 1, in which any of the above described embodiments of the present invention is deployed, will exhibit characteristics attributable to secure processing of information and may thus be called a secure processor. Similarly, the memory module (MM) may also be referred to as a secure memory (MM). In this system the internal memory (MM) is secure because the memory access controller acts as a firewall—any time the secure processor needs to load code (or any data) from outside the secured area the secure memory management module receives the request from the secure processor and then does all the verification and authentication required to guarantee its security, using the segment descriptor. The secure processor (CP) (a processor comprising secure functionality and other built-in security features) is further secured thanks to the isolation provided by the memory access controller and the secure memory management module working together.

The service mode will now be described, in the so-called "service mode", the storage device is attached to one or more external processors i.e. at least a second processor as opposed to the first processor mentioned above. According to this aspect of the invention, the memory access controller still acts as a firewall between the first processor (mentioned above as simply "processor") and the memory module in the sense that it only allows the first processor (having the necessary rights and at the appropriate time—i.e. when operating in the appropriate mode) to access the memory module directly if the memory access requested by the first processor relates to data which is already loaded in the memory module. In this service mode however, it is not the first processor which initiates the request to load the memory module (internal memory) with data which is not already there, it is the second processor. The second processor loads code and/or data into the internal memory with the help of the secure management module. The secure memory management module therefore also monitors the second processor by interpreting the commands received from the external microcontroller. Whenever the external microcontroller makes a request to load data from the external storage device (external memory) to the memory module it also provides the data (code or code and data) to be loaded from the external storage device. The data may be arranged in segments as before. The segment has access control data associated with it. The secure memory management module loads the segment from the storage device into the memory module and programs or instructs the memory access controller to give the first processor access to the segment in the memory module if the first processor satisfies the access conditions at that particular time i.e. at the time when the second processor requests the first processor to run the code. This is done by the secure memory management module updating a segment descriptor in the memory access controller using the access conditions found in the segment (header). The secure memory management module also checks the authenticity of the data (segment) and the authenticity of the access conditions.

Figure 2:
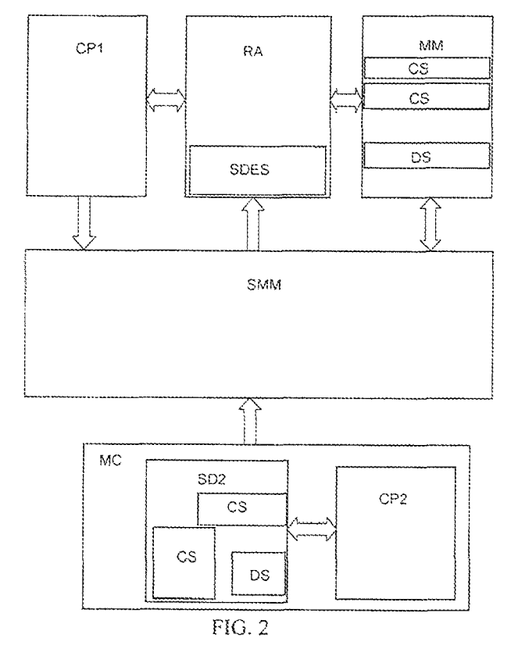
FIG. 2 shows a data processing system comprising a first processor (CP1), a memory module (MM), a storage device (SD), a memory access controller module (RA) and a secure memory management module (SMM), the storage device being comprised within an external processing module or microcontroller (MC) having a second processor (CP2) connected to the storage device, the system being suitable for deploying an embodiment according to a further aspect of the present invention. The external processing module (MC) may also be referred to as an external element in the context of the present invention.

Another embodiment of the present invention, compatible with the "service mode" above, will now be described with reference to FIG. 2, representing a system in which this other embodiment of the present invention may be deployed. In this system, the previously described secure zone comprises the secure processor (CP1), the memory access controller (RA), the internal memory or secure memory (MM) and the secure memory management module (SMM). The system further comprises, in a non-secure zone, an external entity (MC). In this example the external entity comprises an external processor (CP2) attached to an external storage device (SD2). The external storage device (SD2) may therefore also be referred to as external memory (SD2) in this embodiment, both the external processor (CP2) and the external memory (SD2), being outside of the secure environment provided by the combination of the memory access module (RA) and the secure memory management module (SMM), are deemed to be non-secure. The secure processor (CP1) and the internal memory (MM) may also be referred to as internal processor (CP1) and secure memory (MM), respectively. This is called service mode because it is an external entity which requests a service of the secure processor.

As mentioned above and with reference to FIG. 2, it is the second processor (CP2) which requests a service, thereby making a request to load the internal memory (MM) with information from the external storage device (SD). In more general terms it can be said that the request comes from an external element. In FIG. 2 the external element is the external microcontroller. The external microcontroller composes the second processor, from where the request originates, and the external storage device from where the information to be loaded into the internal memory resides. In another case the external storage device may not be physically located within the microcontroller, although it will be outside the secure part of the system comprising the memory management module, the internal memory, the first processor and the secure memory management module, hence the name external storage device. For this reason it can be said in more general terms that the external element has access to the external storage device. According to other embodiments the external element could be just a process or application running outside of the secure area (or a plurality of interdependent processes). The external element may therefore be hardware or software.

According to this embodiment of the present invention, suitable for deployment in a system configured according to a service-oriented architecture, the external processor (CP2) may request one or more services of the internal processor (CP1). This deployment of the embodiment of the present invention is therefore referred to as the "service mode". Service oriented architecture is based on structured collections of discrete software modules known as services. The services collectively provide a complete functionality within a larger or more complex software application. Each service provides a well defined set of functions and is built as a discreet piece of code.

According to the embodiment, the external processor (CP2) makes a request to the secure processor (CP1) for a service, a, b or c for example, through the secure memory management module (SMM). The secure processor (CP1) needs to have access to the particular code required to perform the service; that particular code therefore is provided by the external processor (CP2). The external processor (CP2) loads the particular code for service a, b or c say, into the internal memory (MM) through the secure memory management module (SMM). In other words, instead of the secure memory management module (SMM) fetching code, which is required by the internal (secure) processor (CP1), from the external memory (SD2), usually because the required code is not already present in the internal memory (MM), it is the external processor (CP2) which supplies the code required to perform the service to the secure memory management module (SMM) for loading into the internal memory (MM), the loading being performed as described in the "master mode" embodiment above. Now, whenever the external processor (CP2) requires a service, it can load the code, via the SMM, from the external memory (SD2) into the internal memory (MM) and have the secure processor (CP1) execute the thus-loaded code. By code in this context, it could mean executable code and associated data.

It can be said then that the secure memory management unit verifies and authenticates any data that is to be loaded into the secure memory (internal memory) whether it is the secure processor which requests the data and that data has to come from outside the secure zone or whether it is an external entity which requests the secure processor to execute a service for which some data has to be loaded from outside the secure zone into the secure memory. A request for a service is usually made by supplying the code (and or data) required to execute all or part of the service. The code is loaded into the memory after the SMM performs its processing and then the secure processor can execute it.

The loading of service code to the internal memory by the external process via the secure memory management module may either be done at some time prior to when the service is required and the internal (secure) processor could then be triggered to execute the service when it is needed by an interrupt or wakeup signal initiated by the external processor. On the other hand the internal processor may do some polling in order to start the processing. Otherwise, the loading and the execution of the service could be done at the same time, i.e. whenever the external processor requests the secure memory management module to load the code into the internal memory, then it is subsequently executed by the internal processor.

In any of the above described embodiments of the different aspects of the present invention it is not necessary for the secure memory management module (SMM) to be a physically separate module from the internal processor (CP, CP1) as long as the functions of both modules are achieved as described above. It is possible for the secure memory module to be realised as being part of the internal processor module, either as a hardware module or as a software module or as a combination of hardware and software within the same module.

The invention claimed is:

1. A data processing system comprising:
at least one first processor;
at least one memory module;
at least one memory access controller connected between the at least one first processor and the at least one memory module;
at least one external processing module having access to a storage device, the storage device comprising:
at least one segment comprising at least one digital information;
at least one access condition associated with the at least one segment;
at least one first authentication data associated with the at least one segment, the at least one first authentication data allowing for the integrity of the information in the at least one segment to be authenticated; and
at least one second authentication data associated with the at least one access condition, the at least one second authentication data allowing for the at least one access condition to be authenticated; and
at least one secure memory management module connected to the at least one first processor, the at least one memory module, the at least one external processing module and the at least one memory access controller;
wherein the at least one external processing module is configured to request the at least one digital information, the at least one secure memory management module being configured to monitor the request, and, in response to the request, to:
authenticate the at least one segment using the first authentication data;

authenticate the at least one access condition using the second authentication data;
send the at least one access condition to the memory access controller; and
load the at least one segment from the at least one storage device to the at least one memory module;
wherein the at least one memory access controller is configured to:
detect a processor status of the at least one first processor;
compare the at least one access condition with the processor status; and
provide access to the at least one memory module by the at least one first processor when the processor status satisfies the at least one access condition; and
wherein the at least one external processing module is outside a secure zone comprising the at least one first processor, the at least one memory module, the at least one memory access controller, and the at least one secure memory management module.

2. The data processing system according to claim 1, wherein the at least one external processing module comprises a microcontroller comprising a second processor connected to the storage device, the second processor being configured to initiate said request.

3. The data processing system according to claim 1, wherein the at least one external processing module comprises a software process.

4. The data processing system according to claim 1, wherein the at least one first processor is realised in hardware, and the at least one secure memory management module is realised in hardware or as a mix of hardware and software.

5. The data processing system according to claim 1, wherein said at least one segment further comprises an integrity figure and said at least one secure memory management module comprises means to check the integrity of said at least one segment by comparing said integrity figure with a calculated integrity figure based on the data in the at least one segment.

6. The data processing system according to claim 1, wherein the at least one access condition defines a condition for reading or writing into or for executing instructions from said at least one memory module being determined by the at least one memory access controller according to a type of access requested by the at least one first processor.

7. The data processing system according claim 1, wherein the at least one access condition comprises a plurality of sets of access data, the at least one processor communicating a processor mode to the memory access controller, said at least one memory access controller selecting the set of access data based on the received processor mode.

8. A method for securely loading digital information from at least one storage device into at least one memory module in a data processing system, said data processing system comprising at least one external processing module having access to the at least one storage device, said data processing system further comprising the at least one memory module, at least one first processor, at least one memory access controller module connected between the at least one processor and the at least one memory module, and at least one secure memory management module connected to the at least one first processor, the at least one memory module, the at least one external processing module and the at least one memory access controller, said method comprising:
requesting, with the at least one external processing module, at least one digital information;
monitoring, with the secure memory management module, the request, and, in response to the request:
locating at least one segment in the at least one storage device containing the at least one digital information;
extracting, from the at least one storage device:
at least one access condition associated with the at least one segment;
at least one first authentication data associated with the at least one segment, the at least one first authentication data allowing for the integrity of the information in the at least one segment to be authenticated; and
at least one second authentication data associated with the at least one access condition, the at least one second authentication data allowing for the at least one access condition to be authenticated;
authenticating, with the at least one secure memory management module, the at least one segment with the first authentication data and the at least one access condition with the second authentication data;
determining, with the at least one secure memory management module, an appropriate region in the at least one memory module to accommodate the located at least one segment;
loading said located at least one segment into the appropriate region in the at least one memory module when the at least one segment has been authenticated by the secure memory management module;
sending, with the at least one secure memory management module, the at least one access condition to the memory access controller;
detecting, with the at least one memory access controller, a processor status of the at least one first processor;
comparing, with the at least one memory access controller, the at least one access condition with the processor status; and
providing access, with the memory access controller, to the at least one memory module by the at least one first processor when the processor status satisfies the at least one access condition;
wherein the at least one external processing module is outside a secure zone comprising the at least one first processor, the at least one memory module, the at least one memory access controller, and the at least one secure memory management module.

9. The method according to claim 8 further comprising:
extracting an integrity figure pertaining to said at least one segment of digital information,
calculating an integrity figure for said at least one segment of digital information,
verifying the integrity of the at least one segment of digital information by comparing the extracted integrity figure with the calculated integrity figure.

10. The method according to claim 8 wherein the at least one storage device is in a non-trusted environment and the at least one memory module is in a trusted environment.

11. The method according to claim 8 wherein the digital information is mapped using a mapping scheme whereby a virtual address is related to a physical address, said virtual address being an address used by the at least one first processor to refer to a piece of digital information and said physical address being an address of a location in the at least one memory module where said digital information is stored.

12. The method according to claim 11 wherein the relationship between the virtual address and the physical address is modified at least once following a load of the at least one memory module.

13. The method according to claim 8 wherein the at least one segment of digital information in the at least one storage device is in an encrypted format, the method further comprising:
   extracting a segment key pertaining to said at least one segment of digital information,
   decrypting said at least one segment of digital information using the extracted segment key.

14. The method according to claim 8 wherein the at least one segment of digital information is encrypted by a key prior to loading into the at least one memory module.

15. The method according to claim 14 wherein the encryption key is based on a random number generated in the at least one secure memory management module.

16. The method according to claim 14 wherein the encryption key is based on a physical address.

17. The method according to claim 8 wherein the at least one memory module is a volatile memory.

* * * * *